United States Patent

Milberger

[15] 3,636,476

[45] Jan. 18, 1972

[54] SOLID-STATE DOUBLE RESONANT PULSER

[72] Inventor: Walter E. Milberger, Severna Park, Md.

[73] Assignee: Westinghouse Electric Corporation, Pittsburgh, Pa.

[22] Filed: Nov. 7, 1969

[21] Appl. No.: 874,755

[52] U.S. Cl. ..................................332/7, 307/243, 328/232, 330/44, 331/6, 332/13

[51] Int. Cl. ..........................................................H03c 5/02

[58] Field of Search .......................332/7, 25, 13, 58; 331/6; 330/44; 328/232; 307/243

[56] References Cited

UNITED STATES PATENTS

| | | | |
|---|---|---|---|
| 3,098,980 | 7/1963 | Dodington | 332/7 |
| 3,274,515 | 9/1966 | Badger | 332/13 X |
| 3,300,735 | 1/1967 | Badger | 332/13 X |
| 3,361,992 | 1/1968 | Massey | 332/13 X |

*Primary Examiner*—Alfred L. Brody
*Attorney*—F. H. Henson and E. P. Klipfel

[57] ABSTRACT

A pulser circuit for high-frequency tubes such as klystrons and the like wherein the klystron is driven "on" and "off" in response to the resonant charging and discharging of the klystron's grid capacitance under the control of a pair of semiconductor switch circuits which alternately operate to first act as a voltage multiplier for the grid capacitance to produce a grid bias potential and then resonantly charge and discharge the grid capacitance to turn the tube "on" and "off" respectively. The resonant operation permits the recovery of energy normally wasted thereby increasing the efficiency of operation as well as requiring smaller power supply voltage. Cascoded transistor chains are used as switches with the base electrode of each transistor being driven by means of a coupling transformer having a multiturn primary and a plurality of single loop secondary windings which are respectively coupled to each base electrode for decreasing transformer capacitance in order to achieve high-video bandwidth.

11 Claims, 3 Drawing Figures

PATENTED JAN 18 1972 3,636,476

SOLID-STATE DOUBLE RESONANT PULSER

The invention herein described was made in the course of a contract number NOw66–0138 with the Department of the United States Navy.

BACKGROUND OF THE INVENTION

1. Field of the Invention

The subject invention relates to circuitry referred to as a modulator or pulser for high-power microwave amplifiers. These microwave amplifiers, for example, are comprised of klystrons or traveling wave tubes, which include nonintercepting control electrodes which may be grids or modulating anodes; however, in either case their function is the same, mainly to turn the amplifier "on" and "off" with the application of a voltage pulse while requiring no conduction current from the modulator. The purpose of the pulser or modulator is simply to charge and discharge the input capacitance of the microwave amplifier and thereby turn the beam current "on" and "off." Moreover, the subject invention discloses a means for preventing much of the power loss normally associated with hard tube pulsers resulting in savings in power consumption, weight, volume and reliability.

2. Description of the Prior Art

Modulators for microwave frequency tubes are well known to those skilled in the art. For example, a discussion of the various types of modulators including line pulsing modulators and the hard tube modulators is contained in Air Force Manual 52–8 entitled *Radar Circuit Analysis* at pages 11–28 through 11–35 inclusive. Additionally a hard tube pulser for a RF klystron amplifier is disclosed in U.S. Pat. No. 3,098,980 issued to S. H. M. Dodington. The teaching of this patent discloses the charging and discharging of the klystron's input capacitance by means of a charge circuit and a discharge circuit controlled by respective multivibrators and additionally including vacuum tubes which operate as constant current devices for charging and discharging the capacitance so that a linearly rising and decreasing voltage waveform is produced thereacross. Another example of a similar type of pulser circuit is disclosed in U.S. Pat. No. 3,274,515 issued to G. M. W. Badger. The apparatus disclosed in the Badger patent includes a pair of switch diodes operated by the voltage appearing across the secondary or respective transformer which receive an "on" and "off" pulse for modulating the anode which controls the flow of current to turn the tube "on" and "off."

Furthermore, resonant charging, both AC and DC, with a diode is known and is used extensively in "line-type" radar modulators. Such a teaching is suggested in U.S. Pat. No. 3,377,541 issued to Z. D. Farkas. The Farkas patent also discloses the concept of generating high-voltage AC current from a lower voltage DC source including a resonant RLC circuit and reversing switch means coupled thereto for reversing the charge on the capacitor at predetermined intervals so that voltage magnification across the capacitor is built up with each succeeding cycle.

SUMMARY

Briefly, the subject invention comprises an improved pulser circuit for a pulsed electromagnetic energy transmission device such as a klystron and utilizes semiconductor components and employs the concept of resonant charging and discharging of the device's input capacitance to turn the beam current "on" and "off." The apparatus includes a first or "charge" cascoded transistor switch chain coupled to a control signal source by means of a transformer having a multiturn primary winding and a plurality of single turn secondary windings respectively coupled to each transistor and a second or "discharge" cascoded transistor switch chain coupled to a control signal source by means of a second transformer having a multiturn primary and a plurality of single turn secondary windings respectively coupled to each transistor of said switch chain. The charge cascoded transistor switch chain is coupled to the input capacitance of a pulsed klystron tube through a first or charge inductance and a first semiconductor voltage blocking diode connected in series with the input capacitance, said first inductance and said input capacitance forming a resonant charging circuit, thereby, and a second or discharge inductance and a second semiconductor voltage blocking diode connected in series between said discharge cascoded switch chain and said input capacitance for providing a resonant discharge circuit for the input capacitance. The first semiconductive voltage blocking diode is poled to conduct the current through said charge cascoded transistor switch chain to said input capacitance only during the resonant charge cycle while the second semiconductor diode is poled to permit current flow only through said discharge cascoded switch chain during the resonant discharge cycle. Additionally, the charge and discharge cascoded switch chains includes an arc protection circuit for dissipating internal arcs intermittently occurring in the klystron.

DESCRIPTION OF THE PREFERRED EMBODIMENT

Figures 1, 2, 3:
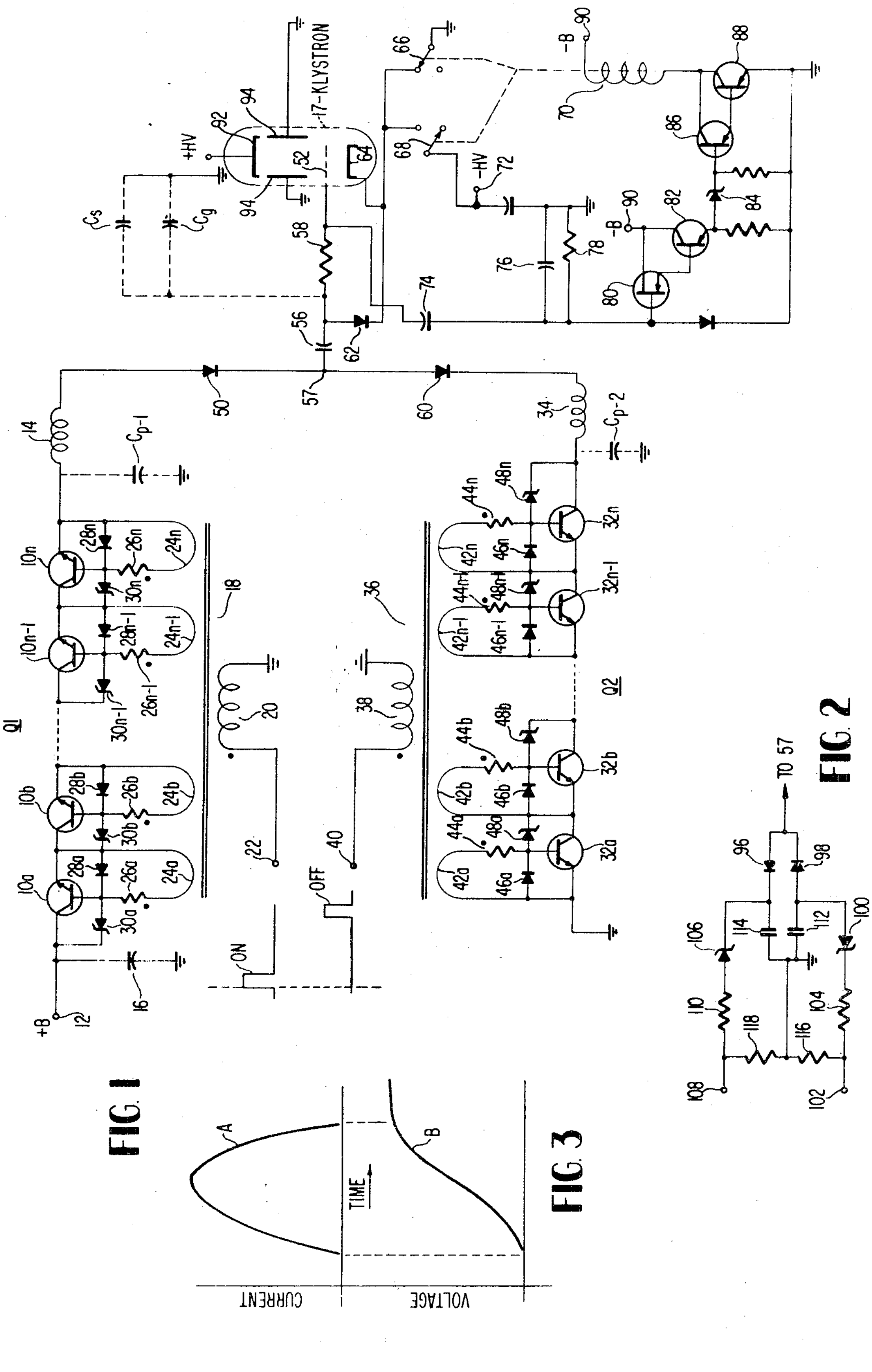
FIG. 1 is an electrical schematic diagram of the preferred embodiment of the subject invention.
FIG. 2 is an electrical schematic diagram of an alternate embodiment of an arc protection circuit utilized in combination with the embodiment shown in FIG. 1.
FIG. 3 is a diagram of the resonant voltage and current waveform exhibited by the input capacitance during operation of the embodiment shown in FIG. 1.

Referring now to FIG. 1, there is disclosed a first or "charge" cascoded transistor switch chain Q1 including the transistors 10*a*, 10*b*,...10*n*–1 and 10*n* having their respective collectors and emitters coupled in series between a positive supply potential +B applied to terminal 12 and one side of a first or charge inductor 14. A filter capacitor 16 is shown connected from terminal 12 to a point of reference potential illustrated as ground for purposes of storing the energy required to pulse a klystron 17. A control voltage designated the "on" pulse is adapted to be coupled across each base-emitter junction of the transistors 10*a*...10*n* by means of a first coupling transformer 18 having a multiturn primary winding 20 which is adapted to receive the "on" pulse across terminal 22 and ground. The transformer 18 includes a plurality of single turn secondary windings 24*a*, 24*b*,...24*n*–1 and 24*n*, respectively coupled to the base and emitter of the transistors 10*a*...10*n* through current limiting resistors 26*a*, 26*b*,...26*n*–1and 26*n*. Additionally, reverse voltage diodes 28*a*,...28*n* are respectively coupled across the base-emitter junctions of the transistors 10*a*...10*n* and equalization Zener diodes 30*a*...30*n* are coupled across the base-collector junctions thereof.

A second or "discharge" cascoded transistor switch chain Q2 includes transistors 32*a*, 32*b*,...32*n*–1 and 32*n* and is identical to the cascoded switch chain Q1 with the exception that the emitter of the first transistor 32*a* is connected to ground whereas the collector of the first transistor 10*a* of Q1 is connected to the +B supply voltage. The collector of the last transistor 32*n* of the switch chain Q2 is connected to one side of a second or "discharge" inductor 34 whereas the emitter of the last transistor 10*n* of the first transistor switch chain Q1 is connected to the "charge" inductor 14. A second coupling transformer 36 is identical to the first transformer 18 and includes a multiturn primary winding 38 which is adapted to be coupled to a second or "off" control signal applied in timed relationship with the "on" pulse and is applied across terminal 40 and ground. Likewise, transformer 36 includes a plurality of single turn secondary windings 42*a*...42*n* coupled to the transistor chain Q2 as previously noted with respect to the transistor chain Q1. The current-limiting resistors 44*a*...44*n* are included as well as the base reverse voltage diodes 46*a*...46*n* and equalization Zener diodes 48*a*...48*n* for the respective transistors 32*a*...32*n*.

A first voltage-blocking semiconductive diode 50 couples the series combination of the first switch chain Q1 and the charge inductor 14 to the grid electrode 52 of the nonintercepting grid klystron 17 through the coupling capacitor 56 and a current-limiting resistor 58. The input grid capacitance of the klystron 17 is depicted as $C_g$ while the associated circuit stray capacitance of the tube is depicted by a capacitor $C_s$ in parallel with the grid capacitance $C_g$. The second transistor switch chain Q2 is coupled in series with the discharge inductor 34 between ground and the grid 52 by means of a second semiconductor voltage blocking diode 60 connected to junction 57 which is also common to the semiconductor 50.

In addition to the circuitry thus far described a third semiconductor diode 62 is connected from the opposite side of coupling capacitor 56 with respect to junction 57 to the common connection of the cathode 64 of the klystron 17 between the normally closed pair of relay contacts 66 and the normally open pair of relay contacts 68. The relay contacts 66 and 68 are operable by a current relay coil 70. The normally closed relay contacts 66 are connected to ground for grounding the cathode 64 when the relay coil 70 is unenergized while the contacts 68 couple a high-voltage negative supply potential −HV applied to terminal 72 to the cathode 64 when the relay coil 70 is energized. A capacitor voltage divider comprising capacitors 74 and 76 are connected in series from the grid 52 to ground with a resistor 78 shunting the capacitor 76. The common connection between capacitors 74 and 76 is connected to a field-effect transistor 80 which in turn is coupled to transistor 82 in a Darlington circuit configuration. Zener diode 84 couples elements 80 and 82 to a second Darlington circuit including the transistors 86 and 88. The relay coil 70 is connected between a −B supply voltage applied to terminal 90 and the collector of transistor 88 and is energized when transistor 88 is rendered conductive.

Before proceeding with a detailed description of operation of the embodiment shown in FIG. 1, it should be observed that when two or more transistors are operated in series, i.e., cascoded transistor strings, and receive their base drive by means of a coupling transformer such as shown in respect to the transistor chains Q1 and Q2 in combination with the respective transformers 18 and 36, the effective bandwidth of the chain becomes less than that of a single stage. The bandwidth shrinkage is attributed mainly to the primary to secondary capacitance of the coupling transformer which is illustrated as the capacitance $C_{P-1}$ and $C_{P-2}$ in FIG. 1. The transistor nearest to the load, i.e., transistors **10*n* and transistor 32*n* "see" only the load capacitance which is $C_g$ and $C_s$ of the klystron 17. In a descending order, the next transistor, i.e., transistor 10*n*−1 and transistor 32*n*−1 sees the load and the primary to secondary capacitance of the windings 24*n* and 42*n*, respectively. This progressive capacitance loading continues down to the bottom transistor which is transistor 10*a* and transistor 32*a*, which sees the load in the combined coupling transformer capacitance $C_{P-1}$ and $C_{P-2}$. Thus it is apparent that the coupling transformer capacitance must be small to achieve high video bandwidth which is necessary for a pulser circuit for microwave tubes. In the embodiment of the subject invention shown in FIG. 1, this criteria has been maintained with respect to both transformers 18 and 36 by means of the single turn secondary windings 24*a*...24*n*, and 42*a*...42*n* respectively. In a typical example, for operation in combination with the subject invention, the transformers 18 and 36** have a stepdown ratio of 25:1. This provides not only minimized capacitance but is able to provide high-voltage isolation which is vitally necessary.

Considering now the operation of the embodiment of the subject invention, its primary function is to resonantly charge the capacitance $C_g+C_s$ by means of the inductor 14 during the first half cycle of operation for turning the beam current of the klystron 17 "on" and then resonantly discharging the capacitance $C_g+C_S$ through the inductor 34 during a second half cycle of operation for turning the beam current "off." Typically, the positive supply voltage +B applied to terminal 12 of the transistor chain Q1 is in the order of 600 volts and the high voltage applied between the cathode 72 and the collector 92 of the klystron 54 is in the order of 10 kilovolts.

Initially, in absence of an "on" and "off" control signal applied to the primary windings 20 and 38 of the transformers 18 and 36 respectively, neither of the transistor chains Q1 and Q2 are operating and the transistors are nonconductive. Additionally, the relay coil 70 is unenergized thereby placing the cathode 64 of the klystron 17 at ground potential through the relay contacts 66 due to the fact that the transistors 80, 82, 86 and 88 are also nonconductive. Upon the application of the first "on" control pulse applied to terminal 22, all of the transistors **10*a*...10*n* of the transistor chain Q1 are rendered conductive which applies the +B potential at terminal 12 to the junction 57 through the inductor 14 and the blocking diode 50. Since the charge on the capacitor 56 cannot change instantaneously it appears as a closed circuit and a current flow path is provided through the diode 62 to ground through the relay contact 66 charging on the coupling capacitor 56. Additionally, however, the input capacitance of the klystron 17 comprising the combination of capacitance $C_g$ and $C_s$ resonantly charges in combination with the inductor 14 during the period that on "on" pulse is applied to the switch chain Q1. The "on" pulse is then removed and the transistor chain Q1 becomes nonconductive. Subsequently, an "off" pulse is applied to terminal 40, whereupon the second transistor chain Q2 is driven "on" and the capacitance $C_g+C_s$ resonantly reverses the charge previously accumulated thereon through the inductor 34 and the transistor chain Q2. The next cycle of operation whereupon the "on" and "off" pulses are applied, accomplish the same operation except that the resonant operation of the capacitance $C_g+C_s$ in combination with the inductors 14 and 34 results in a voltage multiplication resulting from the increased energy storage of $C_g+C_s$. This voltage appears as a grid bias at the grid 52 and is many, many times higher (6,000 volts) as compared to the magnitude of the voltage (600 volts) applied to the positive supply terminal 12. The voltage appearing at the grid 52 of the klystron 17 appears across the capacitance voltage divider including capacitors 74 and 76 and is designed such that when the coupling capacitor 56 is fully charged and the grid 52 is in the region of " 6,000 volts" the voltage appearing across resistor 78 is sufficient to trigger transistors 80 and 82 into conduction. This operation exceeds the threshold value of the Zener diode 84 whereby the transistors 86 and 88 are also rendered conductive. The collector current now flowing in the transistor 88 energizes the relay coil 70, whereupon relay contacts 66 open and contacts 68 close. This operation causes the cathode 64 of the klystron 17 to become ungrounded and applies the negative high voltage (−10,000 volts) thereto which is applied at terminal 72. With the negative high-voltage potential applied to the cathode 64, the klystron 17 will commence operating and the beam current will be rendered "on" and "off" upon the subsequent application of additional "on" and "off" pulses due to the resonant charging and discharging of the capacitance $C_g$ and $C_s$ by means of the inductors 14 and 34**, respectively.

The current pulse flowing during the charge cycle has two sinusoidal components. The principal component flows through the resonant load capacitor including the capacitances $C_g+C_s$ while the secondary component flows through the parallel capacitance $C_{p-2}$ of the nonconducting transistor chain Q2. The resonant frequency of the first component is proportional to $[L\times(C_g+C_s)]^-$ The resonant frequency of the second component is proportional to $(2L\times C_{p-2})^{-1/2}$. Since $C_{p-2}$ is much smaller than the resonant load capacitance due to the single turn secondary windings **42*a*...42*n*, its resonant frequency is much higher. Likewise its circuit Q is equal to or greater than that of the main component. The benefit derived from this condition is that the blocking diode 60 is back biased before the main charge cycle is completed. Thus no energy is transferred from the grid capacitance $C_g+C_s$ to the capacitance $C_{p-2}$. Energy transfers to the capacitance $C_{p-1}$ of the transistor chain Q1 which is conductive is likewise inhibited since the steering diode 50** is back biased at the completion of the charge period. Thus the input capacitance $C_g+C_s$ is alternately resonantly charged and discharged to control the beam current of the klystron 17. The resulting waveforms appearing across the grid 52 is depicted in FIG. 3 wherein curve A is indicative of the current waveform which is one-half of a sine wave while curve B is indicative of the voltage waveform which comprises a cosine waveform.

A solid state pulser circuit shown in FIG. 1 is a further improvement over the known prior art in that it is adapted to provide protection against destruction when internal arcs in the klystron 17 occur between the grid 52 and the grounded body 94. When this condition occurs, the grid 52 becomes grounded and the stored charge accumulated on the coupling capacitor 56 attempts to discharge through the transistor chain Q2 by means of the blocking diode 60 and the inductor 34. This, however, will cause the collector-base equalization Zener diodes 48a...48n to conduct. This will in turn cause all of the transistors 32a...32n to simultaneously become conductive. The charge is thereby dissipated in the transistors 32a...32n and the resistor 58. The inductor 34 on the other hand limits the maximum peak current well within the ratings of the semiconductor components in the chain Q2. At the termination of the current flow through the inductor 34, a negative alternation is generated by the flywheel effect of the collapsed field surrounding the inductor 34 which is then absorbed by the transistor chain Q1 in the same manner. Additionally, if the arc is of such duration that the grid voltage of the grid 52 goes below the value of the negative high voltage applied to terminal 72, diode 62 will shunt the high-voltage source through the limiting resistor 58. For sustaining arcs, the circuitry surrounding the relay coil 70 causes the relay coil 70 to become deenergized thereby returning the cathode 64 to ground through the contacts 66 and thus cutoff the beam current; however, operation of the klystron 17 will commence when the grid bias is reestablished as previously described.

When desirable, additional arc protection circuitry may be employed and comprises the circuit shown in FIG. 2 which includes the diodes 96 and 98 having opposite terminals thereof commonly coupled to junction 57 which is a common connection between the coupling capacitor 56 and the blocking diodes 50 and 60. The circuit additionally includes a Zener diode 100 connected between the anode of diode 98 and a signal terminal 102 by means of the resistor 104. In a like manner, another Zener diode 106 is coupled between the cathode of the diode 96 and the signal terminal 108 by means of the resistor 110. A capacitor 112 is connected between ground and the common connection between the anodes of the diode 98 and the Zener diode 100 while a similar capacitor 114 is connected between ground and the cathode electrodes of the diode 96 and the Zener diode 106. Finally, the resistor 116 and 118 having a common connection coupled to ground while the opposite ends thereof are respectively connected to signal terminals 102 and 108.

When the circuitry shown in FIG. 2 is connected to junction 57 the action of the circuit is as follows:

The video pulse developed by charge and discharge chains Q1 and Q2 serve to charge capacitor 114 positive by means of the conduction of diode 96 and to charge capacitor 112 negative by means of the conduction of diode 98 to the respective peak positive and negative excursion of the pulse appearing at junction 57 during the initial turn-on period. Thus both diode-capacitor combinations act as a bipolar peak detector which cease to conduct after peak charge has been obtained thereby becoming an inactive element during normal operation. The values of capacitors 114 and 112 are made to be much greater than that of coupling capacitor 56. Thus when the grid 52 of the klystron 17 becomes grounded through an arc condition, the charge of capacitor 56 is dumped into the bipolar peak detector rather than into the pulser circuitry. Zener diodes 106 and 100 are chosen to have a somewhat higher Zener voltage level than the peak video positive and negative excursions. Thus following an arc condition which increases the voltage of capacitor 114 and/or 112, the Zener diodes 106 and 100 conduct to maintain a maximum safe level. The signal terminals 108 and 102 may be monitored when desirable and coupled to inhibit gates, not shown, to turn the switch chains Q1 and Q2 off for extended arc conditions. This action is particularly adapted for quenching an arc during high PRF condition.

What has been shown and described therefore is a solid state double resonant switch pulser particularly adaptable for triggering nonintercepting grid transmitter tubes; however, it should be observed that it is also adaptable to be used for other types of modulators, for example, laser crystal modulators. It may also be utilized for intercepting grid devices having relatively large input capacitances in respect to intercept current. Additionally, the double resonant charging circuit may utilize other types of switching devices where desirable, such as SCR's, PNPN-diodes, etc.

I claim as may invention:

1. A solid-state double resonant switched pulser circuit for controlling the beam current of a high-frequency electromagnetic energy transmission device such as a klystron having at least one control element including an input capacitance which is adapted to be resonantly charged and discharged from a source of supply voltage, comprising in combination:

a coupling capacitor having one side thereof coupled to said one control element;

a resonant charging circuit coupled to the other side of said coupling capacitor and including, a first plurality of synchronously switched cascode-connected solid-state switch means, each having a pair of output electrodes and an input electrode;

first circuit means coupling one of said pair of output electrodes of the first switch means of said first plurality of switch means to said source of supply voltage;

first transformer means for operating said first plurality of switch means and having a primary winding and a plurality of secondary windings;

second circuit means coupling said primary winding to a first electrical control signal;

third circuit means respectively coupling said plurality of secondary windings to the input electrode of said first plurality of switch means, being operable to couple said first control signal thereto for rendering all of said first plurality of solid-state switch means simultaneously conductive during a first half cycle of operation and nonconductive during a second half cycle of operation;

a first normally nonsaturable inductor, forming a resonant charge circuit in combination with the input capacitance of said device, having one end thereof coupled in series to the other output electrode of the last of said first plurality of switch means; and a first semiconductor blocking diode coupling the other end of said first inductor in series to said other end of said coupling capacitor, being selectively poled to permit current flow through said resonant charge circuit from said source of supply voltage during said first half cycle of operation; and a separate resonant discharge circuit for said input capacitance commonly coupled to said one side of said coupling capacitor and including, a second plurality of synchronously switched cascode-connected solid-state switch means, each having a pair of output electrodes and an input electrode;

fourth circuit means coupling one of said pair of output electrodes of the first of said second plurality of switch means to a point of reference potential;

second transformer means having a primary winding and a plurality of secondary windings;

fifth circuit means coupling said primary winding of said second transformer means to a second electrical control signal applied in timed relationship with said first electrical control signal;

sixth circuit means respectively coupling said plurality of secondary windings of said second transformer means to said input electrode of said second plurality of switch means, being a second normally nonsaturable inductor, forming a resonant discharge circuit in combination with said input capacitance, having one end thereof coupled to the other output electrode of the last of said second plurality of switch means; and a second semiconductor blocking diode coupling the other end of said second inductor in series to said other end of said coupling capacitor, being selectively poled to permit current flow through said resonant discharge circuit during said second half cycle of operation.

2. The invention as defined by claim 1 wherein said first and second transformer means each has a primary to secondary winding ratio in the order of 25:1.

3. The invention as defined by claim 2 wherein said plurality of secondary windings of said first and second transformer means are each comprised of single turn secondary windings.

4. The invention as defined by claim 1 wherein said plurality of solid-state switch devices are comprised of:

transistors of like conductivity connected in cascode circuit relationship and wherein said pair of output electrodes are comprised of the collector and emitter electrodes respectively and said input electrode comprises the base electrode.

5. The invention as defined by claim 4 wherein each transistor additionally includes, a semiconductor diode having a cathode and an anode, connected between said base and emitter electrode, said anode being connected to said emitter electrode and said cathode being connected to said base electrode, and a Zener diode having a cathode and an anode, connected between said base and collector electrode, said anode being connected to said base electrode and said cathode being connected to said collector electrode.

6. The invention as defined by claim 1 and additionally including:

a nonintercepting grid klystron having a cathode, a grid, a body, and a collector, and wherein said one control element comprises the grid and said input capacitance comprises the distributed and stray capacitance between said grid and said point of reference potential.

7. The invention as defined by claim 6 and additionally including:

a high-voltage power supply potential:

seventh circuit means for sensing the voltage appearing at said grid during said first and second half cycles of operation, and a relay circuit having a coil, a pair of normally closed contacts and a pair of normally open contacts, including means coupling said coil to said voltage-sensing circuit and said pair of normally open and closed contacts between said cathode and said high-voltage power supply potential and said point of reference potential, respectively, being operable to be energized when said grid exhibits a predetermined grid bias potential to disconnect said cathode from said point of reference potential and apply said high voltage power supply potential thereto whereupon the beam current will be rendered "on" and "off" upon subsequent application of first and second control signals to said first and second transformer means respectively.

8. The invention as defined by claim 7 wherein said seventh circuit comprises:

a capacitance divider coupled between said grid and said point of reference potential; and at least one other semiconductor switch having an input electrode and a pair of output electrodes including circuit means coupling said input electrode to said voltage divider and circuit means coupling said coil to said output electrodes and being energized when said one other semiconductor switch becomes conductive upon said grid reaching said predetermined bias potential.

9. The invention as defined by claim 6 and additionally including:

another semiconductor diode, having a cathode and an anode, connected directly between said cathode and said one side of said coupling capacitor, said cathode being connected to said cathode of said klystron and said anode being connected to said one side of said coupling capacitor.

10. The invention as defined by claim 6 and additionally including:

a resistor connected between said grid of said klystron and said coupling capacitor and semiconductor arc protection circuit means coupled between said other side of said coupling capacitor and said point of reference potential for permitting current flow between said body of said klystron and said grid during grid-to-body arcs to be limited to a safe value by the magnitude of said resistor.

11. The invention as defined by claim 10 wherein said arc protection circuit comprises:

peak detector means responsive to the peak-to-peak excursion of the voltage appearing at said common junction, and Zener diode means coupled between said peak detector and said point of reference potential and having a Zener voltage greater than said peak-to-peak excursion.

* * * * *